United States Patent
Andela

(10) Patent No.: US 8,146,841 B2
(45) Date of Patent: Apr. 3, 2012

(54) PRODUCTION OF CLEAN GLASS PARTICLES FROM POST-CONSUMER WASTE

(75) Inventor: Cynthia Andela, Richfield Springs, NY (US)

(73) Assignee: Glass Processing Solutions, LLC, Richfield Springs, NY (US)

( * ) Notice: Subject to any disclaimer, the term of this patent is extended or adjusted under 35 U.S.C. 154(b) by 23 days.

(21) Appl. No.: 12/805,335

(22) Filed: Jul. 26, 2010

(65) Prior Publication Data

US 2012/0018548 A1    Jan. 26, 2012

(51) Int. Cl.
*B02C 19/00* (2006.01)

(52) U.S. Cl. ........... 241/14; 241/19; 241/23; 241/24.14; 241/24.19; 241/24.22; 241/25; 241/79; 241/79.1; 241/80; 241/99; 241/100; 241/101.2

(58) Field of Classification Search .............. 241/14, 241/19, 23, 24.14, 24.19, 24.22, 25, 79, 79.1, 241/80, 99, 100, 101.2
See application file for complete search history.

(56) References Cited

U.S. PATENT DOCUMENTS

| | | | | |
|---|---|---|---|---|
| 4,844,351 | A * | 7/1989 | Holloway | 241/14 |
| 5,350,121 | A * | 9/1994 | Vitunac et al. | 241/14 |
| 5,524,837 | A * | 6/1996 | Raynes | 241/14 |
| 5,620,101 | A * | 4/1997 | Andela et al. | 209/288 |
| 5,758,832 | A | 6/1998 | Grainger | |
| 5,820,541 | A * | 10/1998 | Berlanga Barrera | 588/249.5 |
| 5,944,268 | A * | 8/1999 | Andela | 241/99 |
| 6,238,516 | B1 | 5/2001 | Watson et al. | |
| 7,413,602 | B2 * | 8/2008 | Grasso et al. | 106/716 |
| 2007/0012599 | A1 | 1/2007 | Bohlig et al. | |

\* cited by examiner

*Primary Examiner* — Mark Rosenbaum
(74) *Attorney, Agent, or Firm* — Michael de Angeli

(57) ABSTRACT

Clean glass particles are produced from post-consumer mixed glass and like waste streams by a series of pulverizing, size- and material-based separation, ozonation, drying, sizing, and paper fluff removal steps.

17 Claims, 5 Drawing Sheets

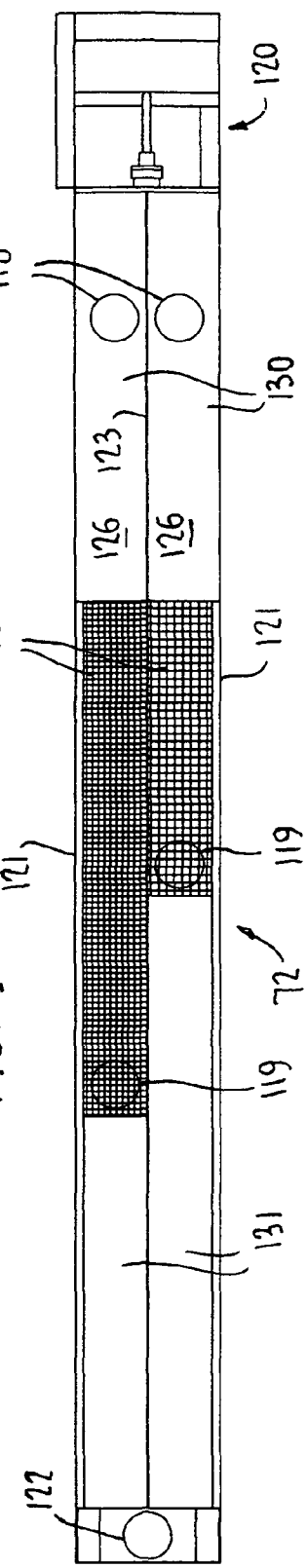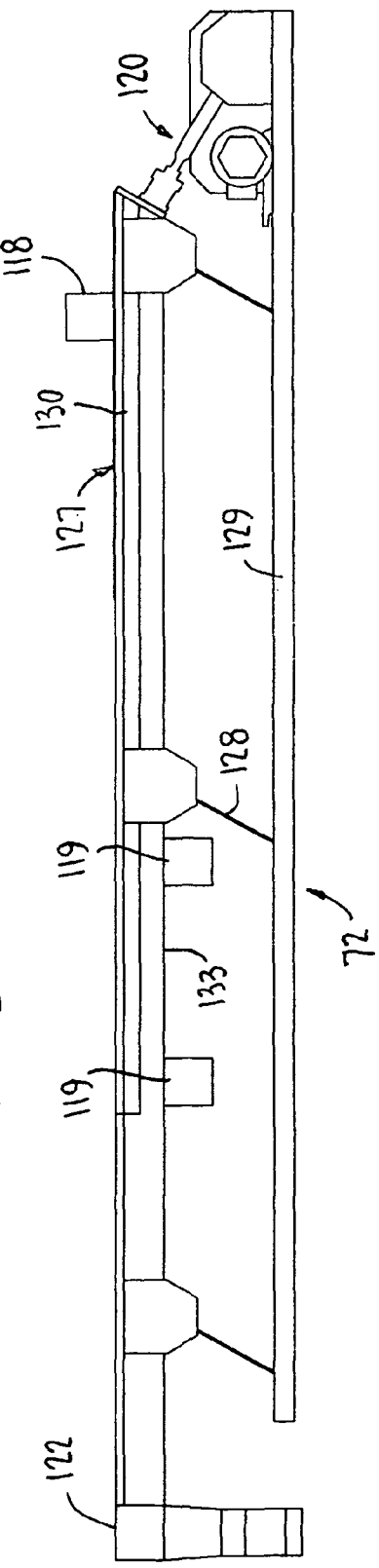

PRODUCTION OF CLEAN GLASS PARTICLES FROM POST-CONSUMER WASTE

FIELD OF THE INVENTION

The present invention relates to the production of clean glass particles, useful in many applications, from a typical post-consumer waste glass stream also including other materials and contaminants.

BACKGROUND OF THE INVENTION

Post-consumer or post-industrial glass is currently largely disposed of in landfills because it is of mixed color, is mixed with odorous non-glass residue, and because there is at present no satisfactory system for producing clean glass particles from the typical waste stream.

Clean glass particles that have rounded edges, are free of odor and have very low levels of organics could be used as a substitute for crystalline silica sand or crushed stone in a variety of applications and uses. These uses include but are not limited to: making glass containers, fiberglass or specialty glass; abrasives for blasting, scouring cleansers, sawing and sanding; filtration for swimming pools or other water filtration; manufacturing bricks, tiles or countertops; recreational uses on golf courses, tennis courts, beaches, and playgrounds; roofing materials; as a substitute for natural sand or crushed stone in manufacturing concrete products; and for general construction and landscaping uses.

For glass particles to be suitable for many of the uses listed above, the organic concentration must be less than 0.5%, as measured by a standard Loss-On-Ignition (LOI) test. As is well known to those of skill in the art, LOI refers to the mass loss of a combustion residue whenever it is heated in an air or oxygen atmosphere to high temperatures. In the cement industry, use of the term LOI normally refers to a mass loss in a sample heated to 950° C. To combustion engineers, the term LOI normally refers to mass losses in samples heated to temperatures less than 950° C. These test methods establish a procedure for determining LOI values for combustion residues heated to 750° C. or 950° C. LOI values from these test methods can be used by industries that utilize combustion residues in various processes and products.

The present inventor and others have disclosed in U.S. Pat. No. 7,413,602 a process and equipment for producing a fine glass powder that is useful as a pozzolanic constituent of concrete from post-consumer waste streams containing a large fraction of glass mixed with other materials. The present invention is directed primarily toward production of larger glass particles, e.g., of the size of grains of sand, and thus useful as a substitute for, e.g., sand in children's sandboxes. To be acceptable for such use the glass particles must have low levels of organics, as above, so as not to give off unpleasant odors, and of course all of the non-glass constituents of the waste stream must be completely removed.

One problem that has not previously been solved in the production of clean glass particles from a post-consumer waste stream is the removal of all paper from the glass particles. Large scraps of paper are readily removed, but tiny fibrous shreds are difficult to remove. Other processes and equipment that have been used in the industry to dry and process waste glass have used a rotary dryer or similar device with an open flame to burn off any residual paper. This process results in residual ashes mixed with the fine glass. As the glass is screened for size separation, it is found that the finer the particle size and grade of glass, the darker the color of the glass mix. The dark color can be attributed to the ash content in the glass.

The present inventor and others have disclosed in U.S. Pat. No. 7,413,602 a process for producing fine glass powder that includes the step of washing the glass particles in a water immersion system to remove paper and other contaminants. The present invention does not use water for washing the glass particles, and thereby eliminates the sediment-removal and water filtration steps that were required in that process.

SUMMARY OF THE INVENTION

According to the invention, clean glass particles suitable for the above uses and others can be produced from a typical post-consumer mix of broken and dirty glass that is mixed with paper, plastics, organics, and metals, where the glass is 80%-95% of the mix, by weight. This is a typical mix and composition of the waste stream produced by single-stream curbside and drop-off recycling programs in the United States and around the world. Without limiting the invention, the process of the invention comprises a series of removal of non-glass constituents, size reduction, screening, sanitizing, drying, classification, and density separation steps.

The process described here selectively reduces the glass so it can be separated from the non-glass material, and then cleans and separates the glass particles by size in such a way that the resulting granulated amorphous silica (glass) particles can be sold as a commodity directly to the consumer (e.g., as sand for children's sandboxes) or for other retail, commercial or industrial applications.

In general, no pre-screening or presorting of the mixture of broken glass, paper, plastic, and metal found in the typical post-consumer recycle stream is necessary, although the non-glass material mixed with the glass should generally be less than six inches in maximum dimension. Many post-industrial waste glass streams can be similarly processed.

The unsorted, dirty post-consumer mix and/or post-industrial waste glass mix is loaded into a surge hopper to meter the material onto a conveyor. A cross-belt magnet is used to remove the ferrous metal. The material is then conveyed into a glass pulverizer to selectively reduce the glass to particles less than ⅜" or ½" in size. The non-glass material in the mix will exit the pulverizer without substantial reduction in size, allowing a size-based separation of glass from metals and plastic to be performed in the next step. In the preferred trommel separator, the glass particles are initially separated into particles of two different sizes, and the non-glass material of larger sizes is separated from the glass.

The preferred pulverizer comprises flexible impactors, which remove paper labels from the glass, so that bits of paper are mixed with the glass but are generally not adhered to the glass particles. First the fine glass is separated from the mix by the trommel screen. Then, as the next larger size of glass and paper mix falls out the bottom of the trommel screen, like a waterfall, an air classification system blows a jet of air across the falling stream and the lighter paper material is caught up in the air flow, separating the paper from the heavier glass that continues falling straight down. The selective reduction of the glass and removal of the paper in the pulverizer along with the fines removal in the screen makes a clean separation by air classification possible.

The non-glass material that exits the trommel separator is comprised of paper, mixed plastics, aluminum, steel, and various organics. This material is conveyed to a non-ferrous separator, typically a separator employing eddy current techniques, to remove the aluminum and ferrous metals from the mix. The aluminum, ferrous metals and mixed paper have value as separately recyclable commodities.

The pulverized glass that falls through the trommel screen can be diverted and sold as a construction aggregate and for many other bulk commodity uses. The organics will typically be less than 1%.

According to an important aspect of the present invention, some or all of the pulverized glass can then be further processed. In these steps of the process, the glass particles are sanitized, preferably by exposure to ozone, dried, and screened. Further sorting by particle size may also be performed.

After sterilization by ozonation, the glass particles are then metered into a fluidized bed dryer where a rapidly-flowing stream of hot air, typically 300 to 400 degrees F., heats the surfaces of the particles of glass as the particles are suspended in a fluidized bed of hot air. The glass is dried and organics are removed with the intense heat. However, the temperature is maintained low enough to keep any small bits of paper or plastics from burning or oxidizing, so that no ash is formed.

The clean glass particles thus produced can be further reduced in size and classified by size and cleaned of any remaining paper fluff in order to produce desired end products.

Thus, the present invention relates to a process and equipment utilizing an indirect heat source, such as a fluidized bed dryer, to dry the glass without incinerating the fine paper, avoiding the production of ashes. Instead the paper is removed by several different techniques, including an air separation step, screening, and final removal using a unique vibratory density screen separation equipment and system. As a result of this invention, the finer the size and grade of glass, the whiter the color. This produces a valuable amorphous mineral filler useful for the purposes mentioned above, and also in cementitious products, manufacture of solid surfaces, or for mixture with epoxies, paints, clay or other binders.

BRIEF DESCRIPTION OF THE DRAWINGS

The invention will be better understood by reference to the accompanying drawings, in which:

FIG. 4 shows a plan view of a preferred vibratory density screen separator for separating glass from paper scraps;

FIG. 5 shows an elevational view of the separator of FIG. 4; and

DESCRIPTION OF THE PREFERRED EMBODIMENTS

Figure 1:
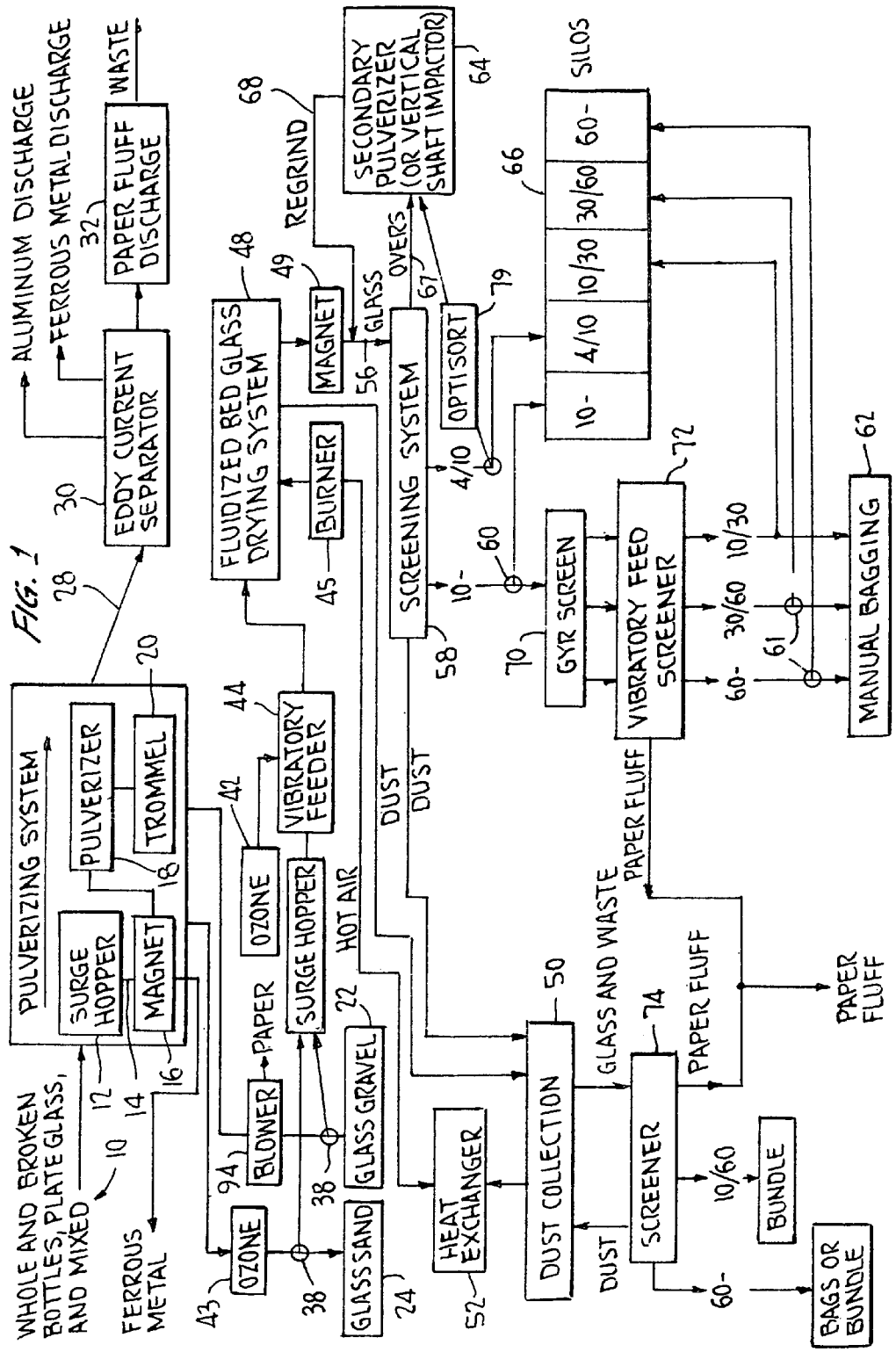
FIG. 1 shows an overview of the primary steps in the process of the invention.

As indicated above, FIG. 1 shows a basic flow diagram of the process of the invention. The waste stream to be processed arrives at 10. In general, no pre-screening or presorting of the mixture of broken glass, paper, plastic, and metal found in the typical post-consumer recycle stream is necessary, although the non-glass material mixed in with the glass should generally be less than six inches in largest dimension. Many post-industrial waste glass streams can be similarly processed.

At 12, the unsorted, dirty post-consumer and/or post-industrial waste glass mix is loaded into a surge hopper to meter the material onto a conveyor indicated at 14. The material is then conveyed under a cross-belt magnet 16 to remove the bulk of the ferrous metal; further steps described below remove any remaining ferrous metal, e.g. bottle caps that are still attached to bottles.

The material is then conveyed directly into a glass pulverizer 18, to selectively reduce the glass to particles less than 3/8" or 1/2" in size. The pulverizer is preferably that shown on James Andela's U.S. Pat. No. 5,944,268, which comprises pivoted impactors rotating in a barrel. The impactors break the glass into particles that are generally cubical in shape, and do not exhibit sharp edges. The non-glass, less-frangible material in the mix will exit the pulverizer without substantial reduction in size, allowing a size-based separation of glass from metals and plastic to be performed in the next step.

Figure 2:
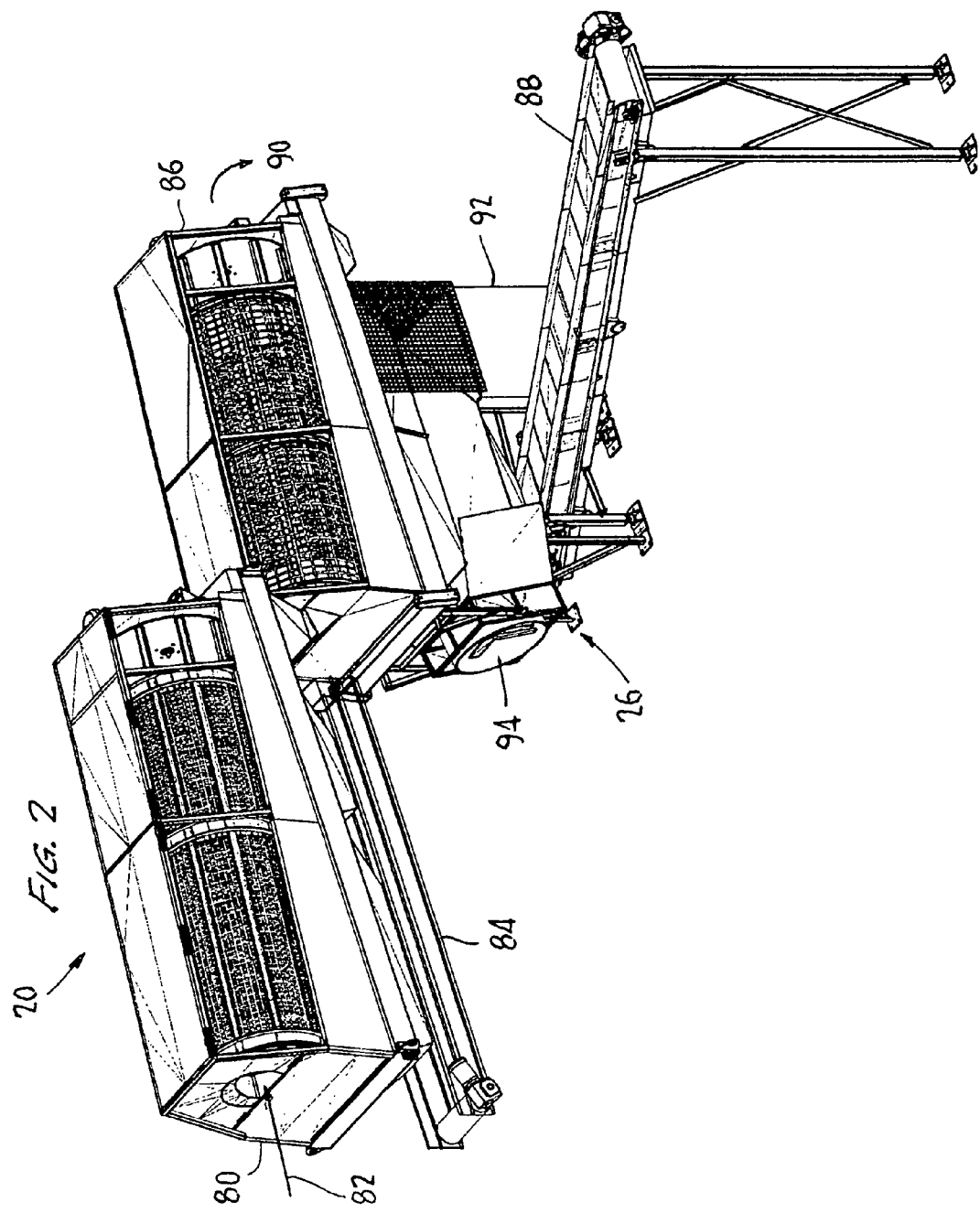
FIG. 2 shows a perspective view of a preferred trommel screen separator unit.

As suggested, size-based separation of the glass particles from larger metal and plastic fragments is then performed, preferably in a rotating barrel or "trommel" screen separator 20 having at least two cylindrical screens of different mesh sizes, connected end-to-end, and rotating about a horizontal axis. Suitable equipment is shown in James Andela's U.S. Pat. No. 5,620,101. The trommel separator 20 may comprise a single unit having two sizes of screen in series or two separate units having differently-sized screens. FIG. 2 shows a suitable assembly of the latter type. As illustrated, the assembly 20 comprises a first unit 80 to which the incoming stream is admitted as indicated by arrow 82. The barrel screen of the first unit 80 will typically have a finer screen of approximately No. 8 mesh or 3/16" so that the pulverized glass particles less than 3/16" will fall through the first screen onto a conveyor 84 to be conveyed to a first collection bin 24 (FIG. 1). The pulverized glass particles greater than 3/16" but less than the size of the second screen segment (typically 3/8" to 1/2" in size) will fall through the barrel screen of a second unit 86 onto a second conveyor 88 and be delivered to a second collection bin 22 (FIG. 1). The non-glass material larger than 1/2", that is, greater than the second screen size, will fall out the end of the trommel screen, as indicated at 90. The glass particles will have thus been separated into particles of two different sizes, and the non-glass material of larger sizes will have been separated from the glass.

The pulverizer's flexible impactors will have removed paper labels from the glass, so that bits of paper are mixed with the glass but are generally not adhered to the glass particles. In general, the pulverizer does not shred the paper to sizes less than No. 8 mesh, that is, approximately 3/16", so that the stream of glass particles exiting the No. 8 mesh or 3/16" screen of the first section 80 trommel separator includes less than 1% paper. Visible bits of shredded paper will be mixed with the glass particles greater than No. 8 mesh or 3/16", but less than 1/2". As this glass and paper mix falls out the bottom of the second section 86 of the trommel, like a waterfall, an air classification system 26, comprising a fan 94, blows a stream of air across the falling stream of glass and paper, so that the lighter paper material is caught up in the air flow, thus separating the paper from the heavier glass, which continues falling straight down. The glass falls onto a conveyor 88 for delivery to bin 22 and the paper is directed by the air flow into a box chute 92 that allows the air to exit and the paper to fall into a separate container or conveyor.

Thus, it can be seen that the selective reduction of the glass and removal of the paper in the pulverizer along with removal of the fines (that is, the glass particles less than 3/16") removal in the first section 80 of the trommel separator 20 makes an effective separation by air classification possible.

The non-glass material that exits the end of the trommel separator is comprised of paper, mixed plastics, aluminum, steel (as some steel bottle caps and rings or lids may have been attached to bottles or confined under the glass on the conveyor 14, so as not to have been removed by the cross-belt magnet 16) and various organic materials adhering thereto. This non-glass material stream is conveyed at 28 to a non-ferrous separator 30, typically a separator employing eddy current techniques to remove the aluminum and ferrous metals from the mix. Suitable equipment is available from Eriez Magnetics of Caerphilly, UK, or from various other manufacturers of eddy current separation technology. A separation system 32 comprising an air classifier may then provide a general separation of the lighter weight paper and plastic from the heavier material. The aluminum, ferrous metals and mixed paper have value as separately recyclable commodities.

The pulverized glass that falls through the trommel screen and is collected at bins 22 and 24 can be sold as a construction aggregate and for many other bulk commodity uses. The organics will typically be less than 1%.

According to an important aspect of the present invention, some or all of the pulverized glass can be diverted by diverters 38, and can then be further processed in a "Clean Glass" plant as discussed in detail below. In these steps of the process, the glass particles are sanitized, dried, and screened. Further sorting by particle size may also be performed. In general, most of the glass would be diverted for further processing as discussed below. However, in the event of a delay or shutdown in the plant implementing the further sanitization, drying and screening steps, the diverters 38 will allow the material to go into the bins 22 and 24 for supply to end users not requiring glass thus processed, or for later further processing. Thus, the presence of the diverters 38 allow the system to be flexible and respond to the market demand. At any time, one or more of the diverters 38 can be activated to produce the different products required to fill orders.

The sized-based separation of the glass particles in the trommel is necessary to remove the paper fluff and produce glass aggregates with LOI less than 1%. The size separation also produces glass aggregates that are graded sand and gravel products, comparable to natural sand and gravel. These can be used as a substitute for the natural products in construction, in asphalt, or in making building materials. Alternatively, after the trommel separation and paper removal, the sizes can be re-combined for processing in the CleanGlass plant. Either sized material mix, ⅜" minus (from 10 mm down to 0.1 mm), or as two different sizes (No. 8 minus and ⅜"—No. 8), can go into the process for cleaning and screening. However, it will be appreciated that the mix and feed rate need to be consistent and steady to allow the system settings and parameters to be properly adjusted to provide a consistent and quality product.

Figure 3:
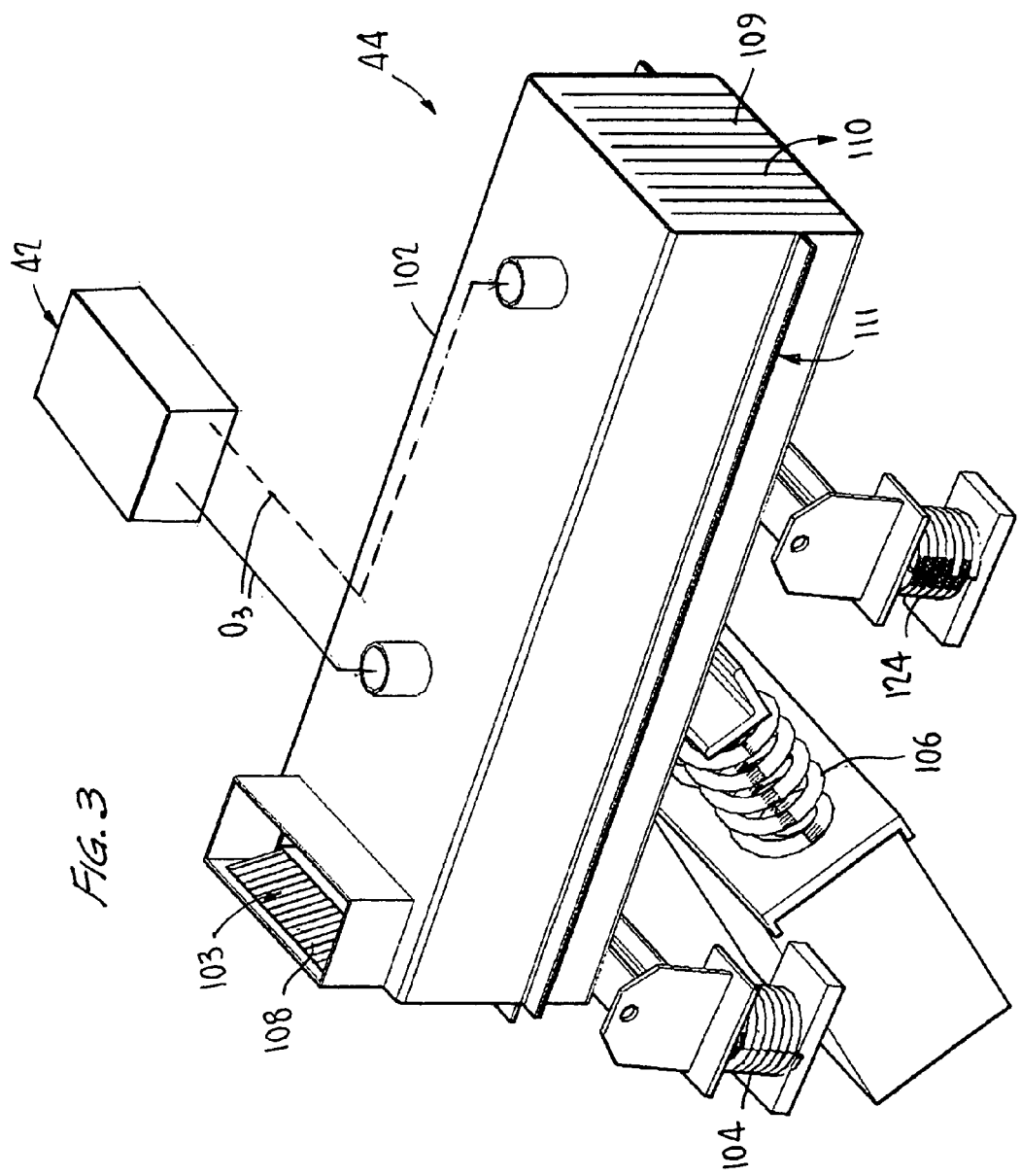
FIG. 3 shows a perspective view of a preferred ozonation unit.

In these further processing steps, ozone will first be applied to the pulverized glass to sanitize it by oxidation of organics, killing any living organisms such as bacteria. Suitable ozone-generating equipment 42 is available from Ozone Systems, Inc. of Mahwah, N.J. This equipment 42 uses a high voltage source to generate ozone from clean compressed air. A small plastic tube delivers the ozone gas to a vibratory feeder 44, shown in detail by FIG. 3. The vibratory feeder 44 (e.g., generally as marketed by Carrier Systems, but modified according to the invention, as discussed below) comprises an enclosure 102 that is mounted on springs 104 to be driven to oscillate by a mechanism 106. Within the enclosure there is a solid pan indicated at 111, mounted to be slightly inclined with respect to the horizontal, so that glass particles, admitted at an infeed indicated at 100, are moved along the pan with each oscillation of the vibratory feeder. The glass particles are lifted slightly off the pan and thrown forward with each oscillation, thus being constantly agitated, so that all of their surfaces are exposed to the ozone gas.

The basic vibratory feeder is modified according to an important aspect of the invention to be enclosed to contain the ozone gas insofar as possible, with flexible "dampers" 108, 109 on the infeed 100 and outfeed 110, substantially sealing the points at which the glass is fed in and out. Thus, the vibratory feeder 44 moves the glass particles along the pan 111 while vibrating it, so that all the glass surfaces are exposed to the ozone gas, while keeping the ozone gas concentration in the enclosed area at the highest level possible, for effective elimination of bacteria. The ozone gas will slowly, but continually, move into the general atmosphere where it is quickly and harmlessly dissipated. Ozone can also be applied to the glass after the pulverizer-trommel-air classification steps, as indicated at 43 (FIG. 1), before or after the material is further processed as below, for example where organic-free glass is needed.

It might be questioned whether ultraviolet radiation (UV), known to be effective for sterilization, might be employed in addition to or in lieu of ozone for sterilization. However, UV only works well if the media is clear. There are substantial quantities of fines in this process so UV would not be effective, and accordingly ozonation is preferred.

The glass particles are then metered into a fluidized bed dryer 48 where a rapidly-flowing stream of hot air, typically 300 to 400 degrees F., heats the surfaces of the particles of glass as the particles are suspended in a fluidized bed of hot air, driving off any residual moisture and organics. A suitable fluidized bed dryer is disclosed in U.S. Pat. No. 7,413,602, to the applicant and others, and referred to above. The glass is dried and organics are removed by the intense heat, while the temperature is controlled to be low enough to prevent any small bits of paper or plastic from burning or oxidizing, so that no ash is formed. Some glass fines and paper and plastic particles exit the top of the fluidized dryer with the hot air stream and are captured in a dust collection system 50, while the fluidized glass particles exit the end of the dryer and are ready to be screened and re-ground as needed. The fluidized bed drying step is useful even though the glass particles are not washed per se, because there is always some residual moisture that needs to be removed to permit fine screening. It also provides sterilization due to the high temperature air and removes the remaining bits of paper and drives off any "sticky" liquids or other organics, as above.

The clean air that exits the dust collection system 50 after the glass fines and paper are removed can be exhausted as clean air and a heat exchanger system 52 can be used to recover the extra heat. This heat can be used to preheat the air going into the dryer or for some other purpose. For example, the hot air is shown being introduced to the burner 45 that heats the air for the fluidized bed dryer. This would save energy by reducing the needed intensity of the heat source (typically a gas flame). Alternatively, this hot air could be used to heat the plant, e.g., with a hot water heat exchanger used to heat the floor.

The typical dust collection system 50 allows the fine glass and paper fluff to drop into a hopper at the bottom of the collector where a rotary valve or similar controllable device allows the material to exit and be conveyed to a screening system 74 to separate the fine glass from the larger paper or plastics. Typically this screening system 74 will be a multiple-deck gyratory screening unit such as those sold by Rotex, Inc. of Cincinnati, Ohio.

The larger dry glass particles that exit the fluidized bed dryer are conveyed by conveyors 56 through a magnet 49, to remove any further ferrous metal, and thence to a screening system 58 for performing size separation. Here the granular glass is divided into, for example, three sizes, e.g., 4 mesh and larger, 4 mesh to 12 mesh, and 12 mesh or finer. This size separation is preferably implemented by a series of primary gyratory screens.

Diverters 60 allow the larger glass particles to be stored, after further processing discussed below, in plastic reinforced sacks that hold one ton of fine glass as a finished clean glass product, as indicated at 62, or in silos, as indicated at 66, or to be conveyed back up into a secondary pulverizer or similar crusher 64 for further size reduction. The crushing technology must not fracture the glass and create sharp edges and it must not shred any small non-glass plastic or metal fines that remain. The pulverizer described in Andela U.S. Pat. No. 5,944,268 will allow the glass to be satisfactorily reduced in size but will preserve any non-glass particles in larger form for subsequent separation. As indicated at 67, larger particles ("overs") can be conveyed directly to secondary pulverizer 64.

More specifically, according to the invention a regrind loop is established including the screening system 58 and the secondary pulverizer 64. This is indicated in FIG. 1 by line 68. In this way all of the glass is eventually reduced to one of several useful sizes, and is sorted accordingly by screener 58.

Glass particles larger than the most-coarse or "top" screen of screener 58, for example, particles larger than 4 mesh, and any non-glass particulates, such as plastics and small metal particles, do not break down, and accordingly tend to stay on top of the screen as they go around and around the re-circulation loop; these will periodically be purged from the system. Still more particularly, after a set time, diverters (not shown) after the secondary pulverizer 64 will open, so that the glass particles and non-glass particulates exit the systems into a bin (also not shown). This "purging" of the system removes the non-glass particles that continue to go around the re-circulation loop. The diverter is closed again after a short period of time, and the re-circulation continues. When the desired particle size is reached, the glass particles go onto a conveyor to be supplied to a second gyratory screening unit 70 or into silos 66.

More particularly, where it is desired to produce the highest grade of glass according to the invention, the glass is supplied to a second set of gyratory screens 70 and a vibratory screening unit 72, which then produce the finished product, that is, clean, odor-free and organic-free granulated glass sorted by size into three or more grades. The gyratory screen 70 provides a first degree of size separation and any remaining paper residue tends to come together to form a paper fluff ball under the action of the gyratory screen, which can then be removed from the glass; that is, the gyratory screen action causes the fine paper fibers to migrate to the top of the fine glass particles and agglomerate due to their shape and density. The fine glass particles then fall onto a vibratory conveying and density separation system 72 under the second set of gyratory screens 70. FIG. 4 shows a plan view of the vibratory density screener separator 72 used in this system to remove the paper fluff balls, FIG. 5 shows an elevational view thereof, and FIG. 6 shows an elevational view of the gyratory screen 70 together with vibratory screen separator density 72.

Figure 6:
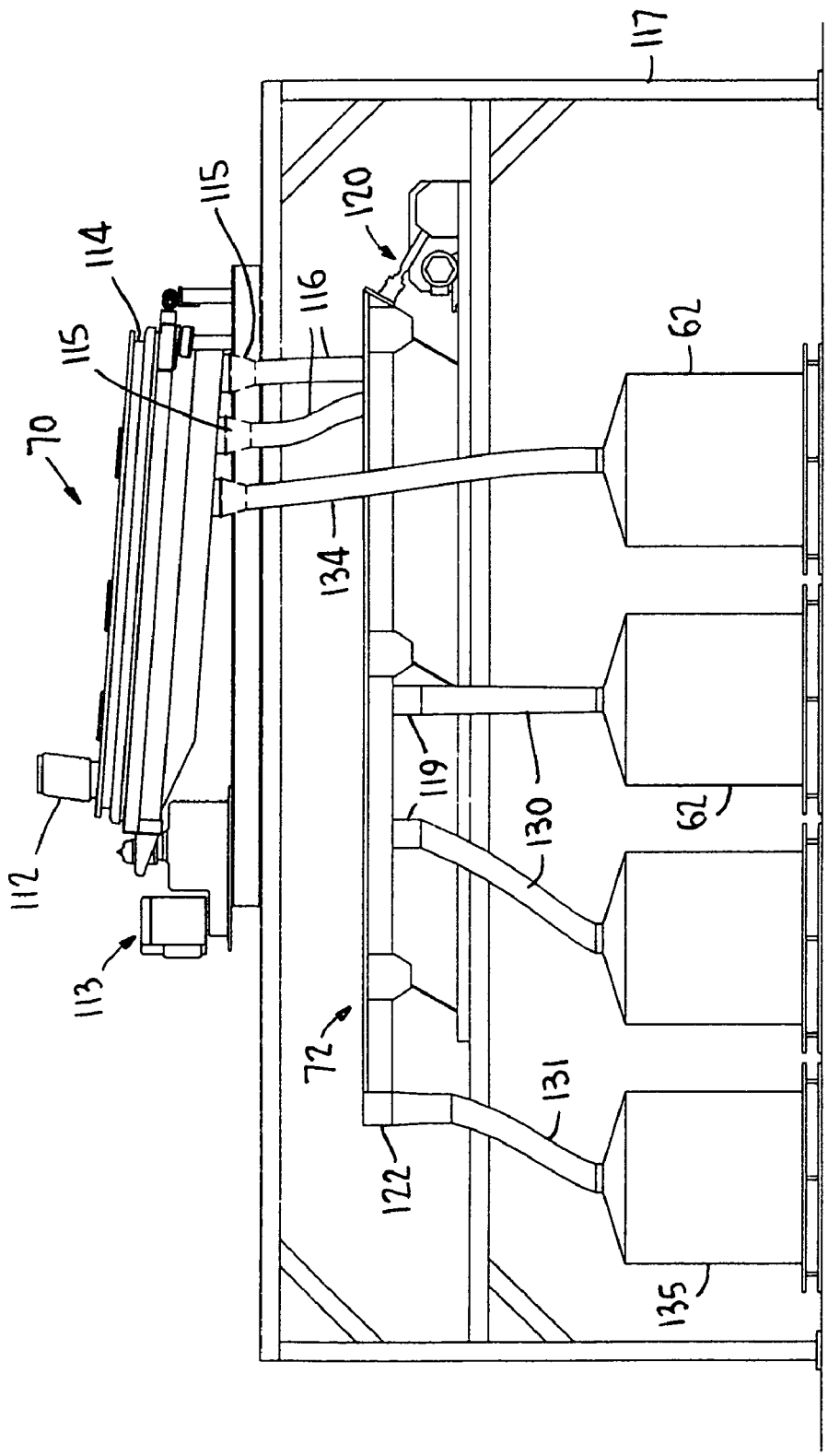
FIG. 6 shows an elevational view of the gyratory screener and vibratory density screen separator together as a paper fluff removal system.

FIG. 6 shows the orientation and relationship between the gyratory screen separator 70 and the vibratory density screen separator 72. The infeed material is fed into the top of the gyratory screener 70 at 112. The gyratory drive unit 113 drives a bed 114, which in this embodiment is a double deck screen, in a generally figure-eight motion in the horizontal plane, such that the glass moves side to side across the top of the screen surfaces. Again, Rotex manufactures a suitable unit. The gyratory screen 70 is also slightly higher at the infeed so the gyratory motion of the screen moves the material side to side and from the infeed 112 to several outfeed ducts 115. The larger paper and glass goes off the top deck of the gyratory screener 70; the middle cut comes off the bottom deck screen and is fine glass with some paper residue. Some or most of the paper residue comes together to form paper fluff balls due to the action of the gyratory screen. The different sizes of glass, typically 10-30 mesh, 30-60 mesh or 60 mesh minus exit the gyratory screen at 115 and go through flexible outfeed hoses 116 into the vibratory separator 72, or directly into bags for shipment of the finished clean glass products, as indicated at 134. More specifically, the product less than 60 mesh is generally free of paper fibers and can go directly into containment as a finished product, or it can also go into the vibratory density separator 72. The gyratory screener 70 is positioned above the vibratory density separator 72, both being mounted on a common support 117.

More specifically, it has been discovered by the inventor that microscopic fibers of cellulose or plastics tend to remain mixed with the fine glass that is typically 10 mesh to 60 mesh in size. That is, while the larger pieces of paper and plastics are initially removed by the air separation unit associated with the trommel separator 20, and further paper and plastic scraps are removed by the fluidized bed dryer 48 and dust collection system 50, microscopic fibers are still mixed in with the fine glass and go through the primary screening units 58 and into the second set of gyratory screening units 70.

The inventor has observed that if these tiny fibers are left in the product, they will migrate through the glass particles due to their difference in density and size, until they find and tangle with other fibers. Typically, multiple fibers tangle with each other and form a paper fluff ball that is larger than the graded glass with which they are mixed. This tends to occur, for example, as the glass particles are processed or transported, so that paper fluff balls are found atop the glass particles in a shipping bag or bulk loaded truck. These paper fluff balls are a major problem to industrial and residential customers who may wish, for example, to use the glass product as a sandbox sand, as an abrasive grit, or in the production of some other product. Further, the formation of these paper fluff balls is an increasing problem, since the amount of paper mixed with the waste glass in the typical waste stream continues to increase.

As noted above, other processors trying to make an acceptable product from waste glass have tried to address the issue by burning off the paper fiber in the glass, resulting in high ash content, or by washing the glass, which is not fully effective and presents sediment-disposal and water-filtration issues.

The present inventor has realized that the very action that causes the paper fibers to agglomerate and form paper fluff balls could be used to remove them; that is, according to an important aspect of the invention, the paper fluff balls are encouraged to form, after which they can readily be removed from the glass particles. The inventor has further discovered that the combination of the gyratory screener 70 and a substantially modified vibratory conveyor 72, having had a second deck added for density separation and screening, would form and then remove the paper fluff balls.

Accordingly, the method and system of the invention are unique in their ability to remove the paper from the glass in a series of process steps including selective reduction of the glass, air classification after the trommel, fluidized bed drying with dust collection, and, finally, paper fluff ball formation and removal. These steps allow the glass product to be free of non-glass constituents, of low LOI, and free of ash.

As mentioned, FIG. 4 shows a plan view of the vibratory density screener separator 72 used in this system to remove the paper fluff balls, and FIG. 5 shows an elevational view thereof. The glass particles, having been separated into two size categories by the gyratory screener 70, together with the paper fluff balls formed in the gyratory screener 70, exit the bottom of the gyratory screener 70 at the outfeed 115 (FIG. 6) and flow down through the flexible tubes 116 into infeed ducting 118 (FIG. 4 and FIG. 5) of the vibratory screener 72. The vibratory screener 72 comprises an elongated metal pan 127 comprising a solid surface 130 in the area where the glass particles fall, and a screened section 125. The pan 127 is divided into two or three aisles 126 by a divider 123 extending the full length of the unit 72, side panels 121 also being provided. FIGS. 5 and 6 show a unit with two aisles but it could be implemented to define three aisles, receiving streams of glass particles of three different sizes from the gyratory screener 70.

The drive unit 120 comprises an eccentric drive unit that moves the entire pan 127 forwards and backwards with a rapid but adjustable frequency, e.g. 50 Hz. The pan 127 is supported on flexible supports 128, e.g., leaf or helical springs. The flexible supports are attached to the base 129.

The glass moves, leftwardly in the embodiment illustrated, along the solid upper deck 130 of pan 127, such that each size of glass stays in its designated aisle 126. The eccentric movement of the pan 127 provides a density separation of the material, as the paper fluff balls that have formed in the gyratory screen migrate to the surface of the layers of glass particles that fill the aisles 126. The depth of the layers of glass particles in each aisle should be at least about ¼" deep and no more than about 1" deep. This will allow the glass and paper to stratify, with the heavier glass on the bottom and the lighter paper fluff balls traveling to the surface of the glass layer and remaining on the surface. Any microscopic paper fibers that did not agglomerate in the gyratory screen will tend to agglomerate with the existing paper fluff balls during this density separation part of the process.

After the density separation takes place, on the right side of the pan 127 as depicted in FIGS. 4-6, the solid upper deck 130 is replaced by a screen deck 125. The size of the screens will vary depending on the sizing of the glass. The pores in the screens 125 will be large enough to allow the correspondingly-sized glass particles to fall through the screen but too small to pass the paper fluff balls. Thus, the paper is first caused to rise to the surfaces of the layers of glass by a density-separation step, and is then separated from the glass by a size-separation step. Accordingly, the glass will fall through the screen portion 125 and land on a lower deck-pan 133 and move there along until it falls out outfeed holes 119. Flexible tubes 130 (FIG. 6) are attached to the outfeeds 119, so that the clean glass falls through the tubes 130 and is collected as desired for shipping, e.g., in bags 62. Alternatively, the flexible tubes, 134, 130 and 131 could be fitted with diverters 61 (FIG. 1), whereby the material can be directed onto conveyors that would transport the material to bulk storage silos 66 (FIG. 1).

The paper fluff, having thus been separated from the glass particles, can now be collected and disposed of. For example, in the embodiment shown, the paper fluff falls off the upper deck screens 125 where they are terminated at a point after the outfeed holes 119. The paper fluff lands on the lower solid deck pan 133 and continues to move, responsive to the eccentric motion created by the drive 120, to the end of the lower pan 133 where it drops into a paper fluff exit hole 122. The paper fluff falls down a flexible tube 131 into a further container 135.

As noted above, post-consumer or post-industrial glass is currently largely disposed of in landfills because it is mixed with odorous non-glass residue, as well as metallic objects, plastics, and the like. The series of grinding, screening, air classification, drying and density separation steps described above allows automated production of granulated glass (amorphous silica) that is suited for many purposes, with rounded edges, free of odor and having LOI's less than 0.5% from dirty glass as found in typical post-consumer and many post-industrial waste streams.

While a preferred embodiment of the invention has been described, those of skill in the art will recognize that there are many alternatives and improvements within the scope of the invention as described by the appended claims.

For example, the fine glass recovered from the dust collection and screening system 50 may also be conveyed to a further set of screens 74 where it is screened for size separation and removal of paper fluff, as noted; it may then be combined with the rest of the finished clean glass products.

FIG. 1 shows an optional ceramic detection and ejection system 79 which can detect and eject any ceramics from the larger (over 4 mesh) glass particles. The Red Wave system from Red Wave of Gleisdorf, Austria is an example of this technology. This may be necessary if the glass is going to the bottle manufacturing and fiberglass markets, as these users find ceramics in the mix unacceptable.

Therefore, the invention should not be considered to be limited by the above description of a preferred embodiment, but only by the following claims.

What is claimed is:

1. A system for producing a stream of clean, sterilized, and sized glass particles from post consumer and like waste streams, comprising:
    a pulverizing system, for breaking the glass into relatively small fragments, while not breaking other less-frangible materials in the waste stream;
    a magnet for removing ferrous metals from the waste stream;
    a trommel separator, for separating the glass fragments by size;
    an air classification system for removing paper and other light materials from at least one of the glass streams exiting the trommel separator;
    an ozone sterilization system, in which the glass particles are exposed to ozone to kill bacteria;
    a fluidized bed dryer, for drying residual moisture from the particles with a stream of hot air at a temperature sufficiently low as to avoid burning or oxidation of non-glass particles;
    a first screening system, for performing size-based separation of the glass particles;
    a gyratory screening device for causing fine fibers of paper and plastic mixed with the glass particles to agglomerate; and
    a vibratory conveyor comprising a pan for receiving a layer of glass particles from the gyratory screening device, the pan being driven in a vibratory manner causing agglomerated fine paper and plastic fibers to rise to the surface of the layer of glass in the pan, and a screen section having a screen of mesh sized such that the glass particles fall through the screen, while the agglomerated paper and plastic fibers remain on the screen for subsequent removal.

2. The system of claim 1, further comprising diverters to allow the flow of glass particles to be diverted to containment devices for storing the glass particles for subsequent use.

3. The system of claim 1, further comprising a re-grind loop including said first screening system and a secondary pulverizer to further reduce the glass without creating sharp edges or breaking down plastic and paper.

4. The system of claim 1, wherein said trommel separator comprises two cylindrical barrel screens of made of screens of different mesh size, arranged in series, with the smaller-mesh screen barrel in the upstream position, so that smaller glass particles are removed first by falling through said smaller-mesh screen, and larger glass particles and large non-glass particles are removed second by falling through a larger-mesh screen, and such that items larger than the mesh size of the second screen exit the second barrel screen.

5. The system of claim 4, where a fan blows air through a stream of larger glass particles and larger non-glass particles falling from said larger-mesh screen, such that lighter materials such as paper scraps are removed from the falling stream of glass.

6. The system of claim 1, further comprising an eddy-current separator for removing metallic material from the waste stream.

7. The system of claim 1, wherein said ozone sterilization system comprises an ozone generator and an enclosed vibratory feeder, such that glass particles in the vibratory feeder are constantly agitated, so that their surfaces are efficiently exposed to the ozone in the chamber.

8. The system of claim 1, wherein said vibratory conveyor comprises a second pan located under said first pan, so that the glass particles falling through said screen fall onto said pan for collection.

9. The system of claim 8, wherein said agglomerated paper and plastic fibers also fall onto said second pan for collection.

10. A method for producing a stream of clean, sterilized, and sized glass particles from post consumer and like waste streams, comprising the steps of
pulverizing the glass into relatively small fragments, while not breaking other materials in the waste stream;
employing a magnet to removing ferrous metals from the waste stream;
employing a trommel separator to separate the glass fragments by size from other less-frangible materials in the waste stream;
blowing a stream of air across at least one of the glass streams exiting the trommel separator for removing paper and other light materials there from;
exposing the glass particles to ozone to kill bacteria;
employing a fluidized bed dryer, to dry residual moisture from the particles with a stream of hot air at a temperature sufficiently low as to avoid burning or oxidation of non-glass particles;
employing a first screening system to perform size-based separation of the glass particles;
agitating the particles in a gyratory screening device to cause fine fibers of paper and plastic mixed with the glass particles to agglomerate; and
providing a vibratory conveyor comprising a pan to receive a layer of glass particles from the gyratory screening device, and driving the pan in a vibratory manner causing agglomerated fine paper and plastic fibers to rise to the surface of the layer of glass in the pan, and passing the glass particles over a screen section having a screen of mesh sized such that the glass particles fall through the screen, while the agglomerated paper and plastic fibers remain on the screen for subsequent removal.

11. The method of claim 10, further comprising the step of providing a re-grind loop including said first screening system and a secondary pulverizer to further reduce the glass without creating sharp edges or breaking down plastics and paper.

12. The method of claim 10, wherein said trommel separator comprises two cylindrical barrel screens of made of screens of different mesh size, arranged in series, with the smaller-mesh screen barrel in the upstream position, so that smaller glass particles are removed first by falling through said smaller-mesh screen, and larger glass particles and large non-glass particles are removed second by falling through a larger-mesh screen, and such that items larger than the mesh size of the second screen exit the second barrel screen.

13. The method of claim 12, where a fan blows air through a stream of larger glass particles and large non-glass particles falling from said larger-mesh screen, such that lighter materials such as paper scraps are removed from the falling stream of glass.

14. The method of claim 10, further comprising the step of employing an eddy-current separator for removing metallic material from the waste stream.

15. The method of claim 10, wherein said ozone sterilization system comprises an ozone generator and an enclosed vibratory feeder, such that glass particles in the vibratory feeder are constantly agitated, so that their surfaces are efficiently exposed to the ozone in the chamber.

16. The method of claim 10, wherein said vibratory conveyor comprises a second pan located under said first pan, so that the glass particles falling through said screen fall onto said pan for collection.

17. The method of claim 16, wherein said agglomerated paper and plastic fibers also fall onto said second pan for collection.

* * * * *